Figure 1:
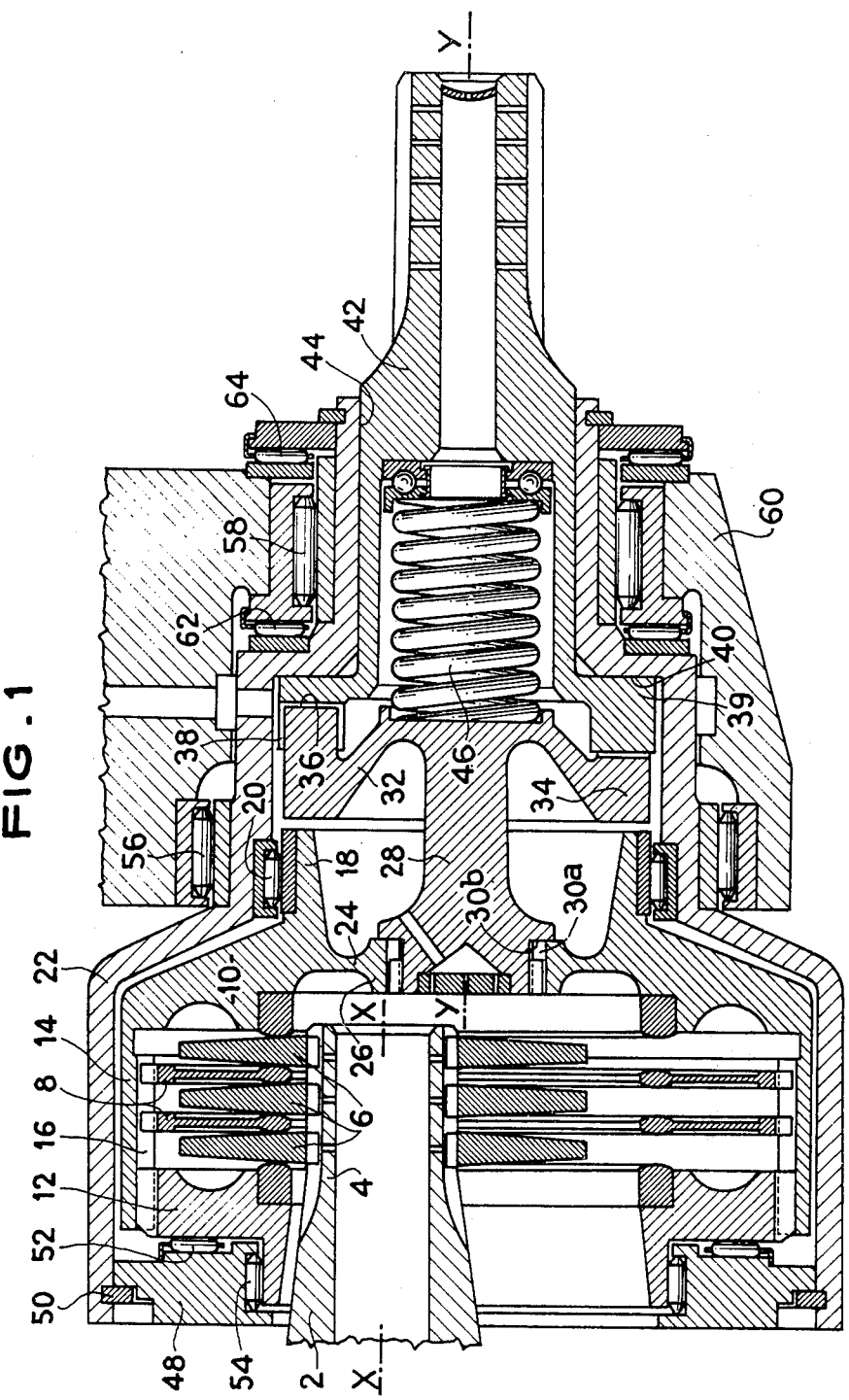

United States Patent [19]

Leveque

[11] 4,047,443
[45] Sept. 13, 1977

[54] SPEED VARIATOR HAVING FRICTION ELEMENTS

[75] Inventor: René Leveque, Orgeval, France

[73] Assignee: Automobiles Peugeot, Paris, France

[21] Appl. No.: 633,024

[22] Filed: Nov. 18, 1975

[30] Foreign Application Priority Data

Nov. 18, 1974 France .............................. 74.37872

[51] Int. Cl.² ............................................. F16H 15/14
[52] U.S. Cl. .................................................... 74/199
[58] Field of Search ................. 74/199, 796, 721, 200, 74/201

[56] References Cited

U.S. PATENT DOCUMENTS

| 2,727,397 | 12/1955 | Jorgensen | 74/199 |
| 2,743,621 | 5/1956 | Beier | 74/199 |
| 3,082,634 | 3/1963 | Battistin | 74/199 |
| 3,190,148 | 6/1965 | Flichy | 74/796 |
| 3,245,272 | 4/1966 | Flichy | 74/199 |
| 3,381,777 | 5/1968 | Flichy | 74/199 |
| 3,387,507 | 6/1968 | Castelet | 74/796 |
| 3,557,636 | 1/1971 | Dangauthier | 74/199 |
| 3,690,192 | 9/1972 | Bouthers et al. | 74/199 |

Primary Examiner—Samuel Scott
Assistant Examiner—Allan R. Burke
Attorney, Agent, or Firm—Burns, Doane, Swecker & Mathis

[57] ABSTRACT

This variator is improved in order to improve reliability and prolong its life.

For this purpose it comprises a friction elements clamping plate provided with two cylindrical skirts which axially extend from opposite sides of the plane of the clamping plate and enable the clamping plate to be supported by the housing by bearings which are axially spaced apart and located on opposite sides of the plane of the clamping plate. Moreover, a ring carrying ramps which adjust the clamping force exerted by the clamping plate in accordance with the torque transmitted is connected to the clamping plate by a relatively deformable connection so that the clamping plate is not subjected to a particularly harmful alternating tipping.

11 Claims, 3 Drawing Figures

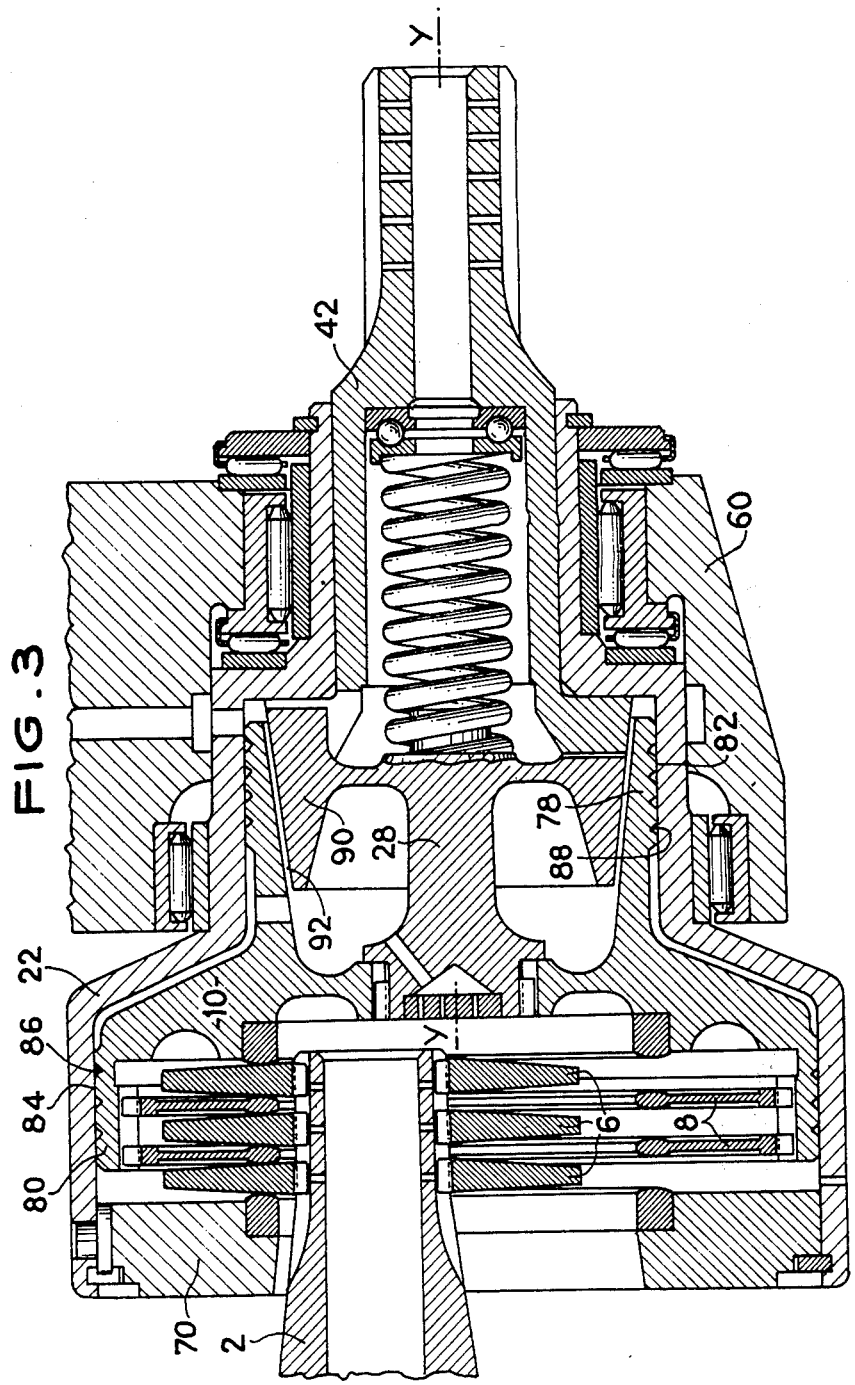

SPEED VARIATOR HAVING FRICTION ELEMENTS

The present invention relates to speed variators having friction elements of the type comprising a first series of friction elements, such as discs, which are connected to rotate with a first shaft and are clamped between elements of a second series of friction elements, such as rings, which are connected to rotate with a second shaft parallel to the first shaft, means being provided to vary the distance between the parallel axes of the two shafts.

In such a variator it is desirable to render the clamping force between the two series of friction elements proportional to the torque transmitted. This results in the following construction: the elements of the second series are slidably keyed in a cylinder integral with a clamping plate which is slidably mounted in a housing connected to rotate with the second shaft, the clamping plate and the second shaft each having a series of conjugate ramps arranged along a circumference concentric with the second shaft.

The friction element clamping force, proportional to the transmitted torque, is then taken by the housing. However, the clamping plate is subjected to tipping forces which are constantly inverted in the course of the rotation, depending on whether the clamping line between the friction elements passes inside or outside the polygon obtained in joining the points of contact of the different ramps. These tipping movements are accentuated owing to the effect of inevitable tolerances in the manufacture of the ramps which results in the fact that the points of contact between the ramps are not strictly within a plane perpendicular to the axis of the shaft. Further, in the prior art, the plate is not guided in a satisfactory manner and this accentuates the aforementioned defect.

In practice there is a rapid deterioration of the surfaces of contact between the friction elements renders the variator useless within a relatively short period of time which forbids its use in certain applications in which reliability and long life are absolutely essential. This is particularly the case in the automobile industry.

An object of the invention is to overcome the aforementioned drawbacks and to provide a speed variator which is considerably improved as concerns reliability and life. More precisely, the object of the invention is to considerably reduce the tipping movements of the clamping plate in the course of operation of the variator.

According to the invention, there is provided in a speed variator comprising a housing, a first shaft having a first axis of rotation, a second shaft which is parallel to the first shaft and mounted in the housing and has a second axis of rotation, a clamping plate axially slidably mounted in the housing and coaxial with the second shaft, a cylinder integral with the clamping plate, an assembly of friction elements consisting of a first single series of said friction elements coaxial with and connected to rotate with the first shaft and a second single series of said friction elements coaxial with the second shaft and slidably keyed in said cylinder, the first series of friction elements being interposed between and clampable between the second series of friction elements, said assembly of friction elements having a first end and a second end which second end is opposed to said first end and adjacent the clamping plate, means for varying the distance between the two shafts transversely of the shafts, and a coupling device for coupling the clamping plate to the second shaft and rendering the clamping force exerted by the clamping plate on the friction elements proportional to the torque transmitted to the second shaft and comprising two sets of cooperative conjugate ramps respectively associated with the clamping plate and the second shaft, said clamping plate being rotatable relative to the second shaft to an extent sufficient to allow relative rotary movement between and operation of said two sets of cooperative conjugate ramps, support means carried by and supported by the housing axially of the second shaft supportingly engaging said first end of said friction elements, said clamping plate engaging said friction elements at said second end of said friction elements substantially in a given transverse plane; the improvement comprising two bearing means which are spaced apart axially of said clamping plate and located axially on opposite sides of said given transverse plane for guiding the clamping plate in the housing.

According to other features of the variator according to the invention:

the clamping plate has a second cylindrical extension on the opposite side of the clamping plate to the first extension and carries one of the two rotary bearing means;

the clamping plate is connected to a support plate so as to rotate with the latter and have practically no radial play, this support plate being guided with respect to the housing and defining one of the two rotary bearing means;

one of the rotary bearing means is provided in the region of the first-mentioned cylindrical extension of the clamping plate;

one of the sets of ramps are provided on a ring which is connected to the clamping plate by a relatively deformable connecting part which is in particular capable of being slightly deformable by bending in order to compensate for any possible faulty centering or alignment resulting from the thrust of the set of ramps carried by the ring on the set or ramps associated with the clamping plate;

advantageously, one of the sets of ring carrying the ramps is disposed radially within the second cylindrical extension of the clamping plate so as to reduce the overall size and increase the distance between the two rotary bearing means for guiding the plate with respect to the housing.

The invention will be described in more detail in the ensuing description with reference to the accompanying drawings which have been given merely by way of example.

Figure 2:
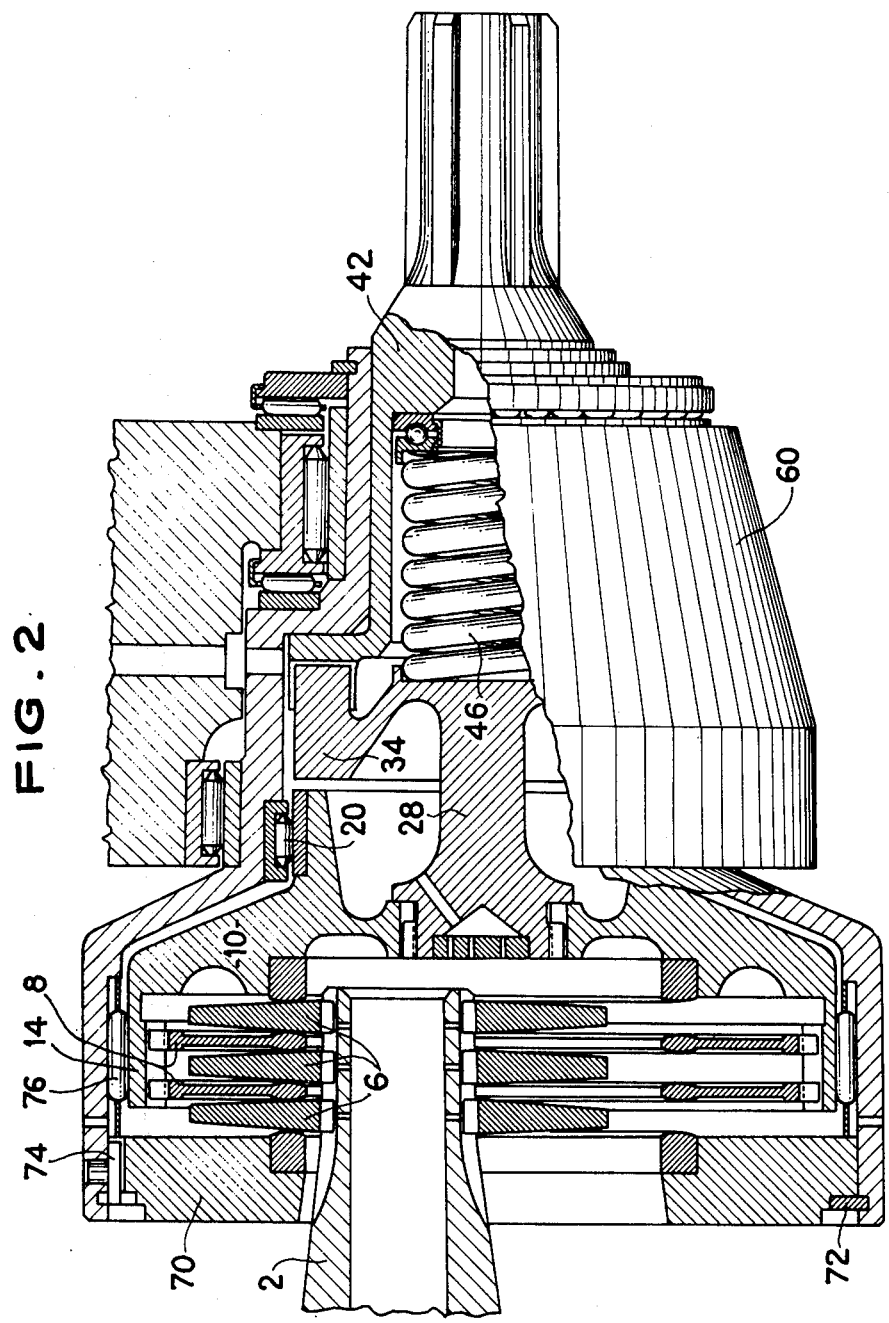

In the drawings:

FIGS. 1 to 3 are axial section views of three embodiments of a variator according to the invention.

In the variator known type of shown in FIG. 1, an input shaft 2 having an axis X—X has one splined end portion 4 on which discs 6 are slidably mounted, the opposite faces of the discs having a frustoconical, curved or like shape.

These discs are interposed between rings 8 and a clamping plate 10 and a support plate 12. An annular end wall 48, mounted in the housing 22 and retained by a ring 50, takes or withstands the force for clamping the discs and rings between the plates 10 and 12 through a thrust needle bearing 52.

The clamping plate 10 is extended on one side thereof by a cylindrical portion or skirt 14 provided with internal splines 16 which cooperate with corresponding splines of the rings 8 and the plate 12. According to the invention, the radial clearance between the plate 12 and the cylindrical portion 14 in the region of the splines 16 is practically zero. The support plate 12 is journalled in this annular wall 48 by a needle bearing 54. The plate 10 is also extended, on the side opposed to the skirt 14, by another cylindrical portion or skirt 18 which is journalled by a rolling bearing 20 in a housing 22.

The structure just described gives the desired result since the clamping plate 10 is perfectly guided by two bearing portions which are sufficiently spaced apart on opposite sides of the clamping plate 10, namely in the region of the bearing 20 and in the region of the support plate 12 which is itself perfectly centered by the bearing 54.

According to a further feature of the invention and to further improve the non-tipping operation of the clamping plate 10, the latter is connected by a thin web 24 to a hub 26 provided with internal splines which cooperate with external splines on a shaft 28 of relatively small diameter. This shaft 28 and the hub 26 axially bear against each other on radial surface 30$^a$, 30$^b$. The shaft 28 is connected by a thin web 32 to a ring 34 provided with a set of ramps 36, preferably three in number, equally spaced apart on a circumference concentric with the shaft 28. These ramps 36 cooperate in the known manner with a set of corresponding ramps 38 carried by a plate 39 which bears against a radial shoulder 40 provided in the housing 22. The plate 39 is integral with an output shaft 42 having an axis Y—Y and in the extension of the shaft 28. The shaft 42 is fitted in a bore 44 in the housing 22.

The sets of ramps 36 and 38 constitute in the known manner a coupling device coupling the clamping plate 10 to the output shaft 42 and rendering the clamping force exerted by the clamping plate 10 on the discs 6 proportional to the torque transmitted to the output shaft 42.

A coil spring 46, disposed between the shaft 28 and the shaft 42, exerts in the known manner a permanent axial force which is transmitted to the discs 6 and rings 8.

An annular end wall 48, mounted in the housing 22 and retained by a ring 50, takes or withstands the force for clamping the discs and rings between the plates 10 and 12 through a thrust needle bearing 52. The support plate 12 is journalled in this annular wall 48 by a needle bearing 54.

The housing 22 is journalled in the known manner by two rolling bearings 56, 58 in a rocker 60 with respect to which it is axially held stationary by two thrust bearings 62, 64. The rocker 60 is employed in the known manner for modifying the eccentricity of the axis Y—Y of the housing 22 and the output shaft 42 with respect to the axis X—X of the input shaft 2.

The structure just described gives the desired result since the clamping plate 10 is perfectly guided by two bearing portions which are sufficiently spaced apart on opposite sides of the clamping plate 10, namely in the region of the bearing 20 and in the region of the support plate 12 which is itself perfectly centered by the bearing 54.

It will be observed that the result of the spacing apart of the bearings 54 and 20 on opposite sides of the clamping plate 10 is considerably improved owing to a centering of the clamping forces exerted on the clamping plate 10, this centering being obtained by the relative flexibility of the shaft 28 and the webs 24 and 32. Indeed, if as a result of manufacturing tolerances the points of contact between the conjugate ramps 36 and 38 are not contained in a plane strictly perpendicular to the axis Y—Y, the very small angular diviation which results may be absorbed by a bending of the connecting part 24, 28, 32, between the ring 34 and the clamping plate 10. Consequently, the latter no longer undergoes a tipping movement which occurred in known arrangements.

In this way the life of the variator is considerably prolonged.

It will be observed that the variator just described may be connected in series with a seond variator whose shaft 42 would constitute the input shaft.

The embodiment shown in FIG. 2 differs from the aforementioned embodiment only in respect of the two following points:

The support plate 12 and the end ring 48 of the first embodiment are in the form of a single member 70 mounted in the housing 22 and retained therein by a ring 72. A key 74 keys the member 70 against rotation in the housing 22 which therefore transmits a part of the torque.

The cylindrical portion 14 extending the clamping plate 10 is directly carried by the housing 22 through a rolling bearing 76.

The clamping plate 10 is here suitably supported by the housing 20 against any tipping movement by the bearings 20 and 76 which are axially spaced apart and located on opposite sides of the transverse plane in which the clamping plate 10 acts on the friction elements or discs 6.

This arrangement simplifies the construction in this part of the variator.

In the embodiment shown in FIG. 3, the variator comprises roughly the same elements as the variator shown in FIG. 2. However, the clamping plate 10 has a cylindrical extension 78 which is disposed on the other side of the plate 10 to the extension 80 and has a length which exceeds the length of the extensions shown in the preceding two embodiments. This enables the distance between the two bearing portions 82, 84 guiding the plate with respect to the housing 22 to be increased, these bearing portions being provided in the presently-described embodiment directly between the two parts and located on opposite sides of the transverse plane in which the clamping plate 10 acts on the friction elements or discs 6. Helical grooves 86 and 88 are provided for improving the lubrication in this region of contact.

Further, the ring 90 carrying the ramps is disposed concentrically within the extension 78, this ring and the extension having confronting frustoconical surfaces so as to dispose the ramps carried by the ring at a sufficient distance from the axis Y—Y.

It will be understood that the clearance 92 between these two elements is sufficient to allow the very slight bending movements which would result from lack of perpendicularity in the region of the points of contact between the conjugate ramps.

This embodiment has the aforementioned advantage of increasing the axial distance between the bearing portions 82 and 88 and consequently improving the guiding of the clamping plate with respect to the housing. It also dispenses with needle bearings and consequently constitutes a simplified embodiment.

The three embodiments shown and described give such results that these variators may be employed in automobile vehicles.

Having now described my invention what I claim as new and desire to secure by Letters Patent is:

1. In a speed variator comprising a housing, a first shaft having a first axis of rotation, a second shaft which is parallel to the first shaft and mounted in the housing and has a second axis of rotation, a clamping plate axially slidably mounted in the housing and coaxial with the second shaft, a cylinder integral with the clamping plate, an assembly of friction elements consisting of a first single series of said friction elements coaxial with and connected to rotate with the first shaft and a second single series of said friction elements coaxial with the second shaft and slidably keyed in said cylinder, the first series of friction elements being interposed between and clampable between the second series of friction elements, said assembly of friction elements having a first end and a second end which second end is opposed to said first end and adjacent the clamping plate, means for varying the distance between the two shafts transversely of the shafts, and a coupling device for coupling the clamping plate to the second shaft and rendering the clamping force exerted by the clamping plate on the friction elements proportional to the torque transmitted to the second shaft and comprising two sets of cooperative conjugate ramps respectively associated with the clamping plate and the second shaft, said clamping plate being rotatable relative to the second shaft to an extent sufficient to allow relative rotary movement between and operation of said two sets of cooperative conjugate ramps, support means carried by and supported by the housing axially of the second shaft supportingly engaging said first end of said friction elements, said clamping plate engaging said friction elements at said second end of said friction elements substantially in a given transverse plane; the improvement comprising two bearing means which are space apart axially of said clamping plate and located axially on opposite sides of said given transverse plane for guiding the clamping plate in the housing.

2. A speed variator as claimed in claim 1, wherein the clamping plate has a second cylinder integral with the clamping plate and disposed on the opposite side of the plate to the first-mentioned cylinder and carrying means defining one of said two bearing means for guiding the clamping plate with respect to the housing.

3. A speed variator as claimed in claim 1, wherein said support means comprise a support plate connected to rotate with the cylinder substantially without radial play between the cylinder and the support plate, the support plate being rotatably supported with respect to the housing and defining one of said two bearing means for guiding the clamping plate.

4. A speed variator as claimed in claim 3, comprising an end wall for the housing in which end wall the support plate is rotatably mounted.

5. A speed variator as claimed in claim 1, wherein one of said two bearing means is located in the region of said cylinder which is integral with the clamping plate.

6. A speed variator as claimed in claim 5, wherein the housing is provided with an end wall which acts as said support plate means and is keyed to the housing.

7. In a speed variator comprising a housing, a first shaft having a first axis of rotation, a second shaft which is parallel to the first shaft and mounted in the housing and has a second axis of rotation, a clamping plate axially slidably mounted in the housing and coaxial with the second shaft, a cylinder integral with the clamping plate, an assembly of friction elements cosisting of a first single series of said friction elements coaxial with and connected to rotate with the first shaft and a second single series of said friction elements coaxial with the second shaft and slidably keyed in said cylinder, the first series of friction elements being interposed between and clampable between the second series of friction elements, said assembly of friction elements having a first end and a second end which second end is opposed to said first end and adjacent the clamping plate, means for varying the distance between the two shafts transversely of the shafts, and a coupling device for coupling the clamping plate to the second shaft and rendering the clamping force exerted by the clamping plate on the friction elements proportional to the torque transmitted to the second shaft and comprising two sets of cooperative conjugate ramps contained in a general plane parallel to said given transverse plane and respectively associated with the clamping plate and the second shaft, said clamping plate being rotatable relative to the second shaft to an extent sufficient to allow relative rotary movement between and operation of said two sets of cooperative conjugate ramps, support means carried by and supported by the housing axially of the second shaft supportingly engaging said first end of said friction elements, said clamping plate engaging said friction elements at said second end of said friction elements substantially in a given transverse plane; the improvement comprising two bearing means which are spaced apart axially of said clamping plate and located axially on opposite sides of said given transverse plane for guiding the clamping plate in the housing, a ring coaxial with the clamping plate and carrying one of said sets of ramps, and a connecting part which is coaxial with said clamping plate and said ring and interconnects the ring and clamping plate, said connecting part being capable of bending between said clamping plate and said ring under the conditions of operations of the variator to accommodate possible lack of parallelism between said given transverse plane and said general plane.

8. A speed variator as claimed in claim 7, wherein the connected part comprises a shaft of small diameter.

9. A speed variator as claimed in claim 7, wherein said connecting part comprises an intermediate shaft and thin web portions which connect the clamping plate and the ring to the intermediate shaft.

10. A speed variator as claimed in claim 7, wherein the clamping plate has a second cylinder integral with the plate and disposed on the opposite side of the clamping plate to the first-mentioned cylinder and carrying means defining one of said bearing means for guiding the plate with respect to the housing, the ring being disposed radially inside the second cylinder.

11. A speed variator as claimed in claim 7, wherein the connecting part comprises an intermediate shaft, a hub connected by splines to the intermediate shaft with which intermediate shaft it is in axial abutting relation, the clamping plate having a web portion which is integral with the clamping plate and with the hub.

* * * * *